UNITED STATES PATENT OFFICE.

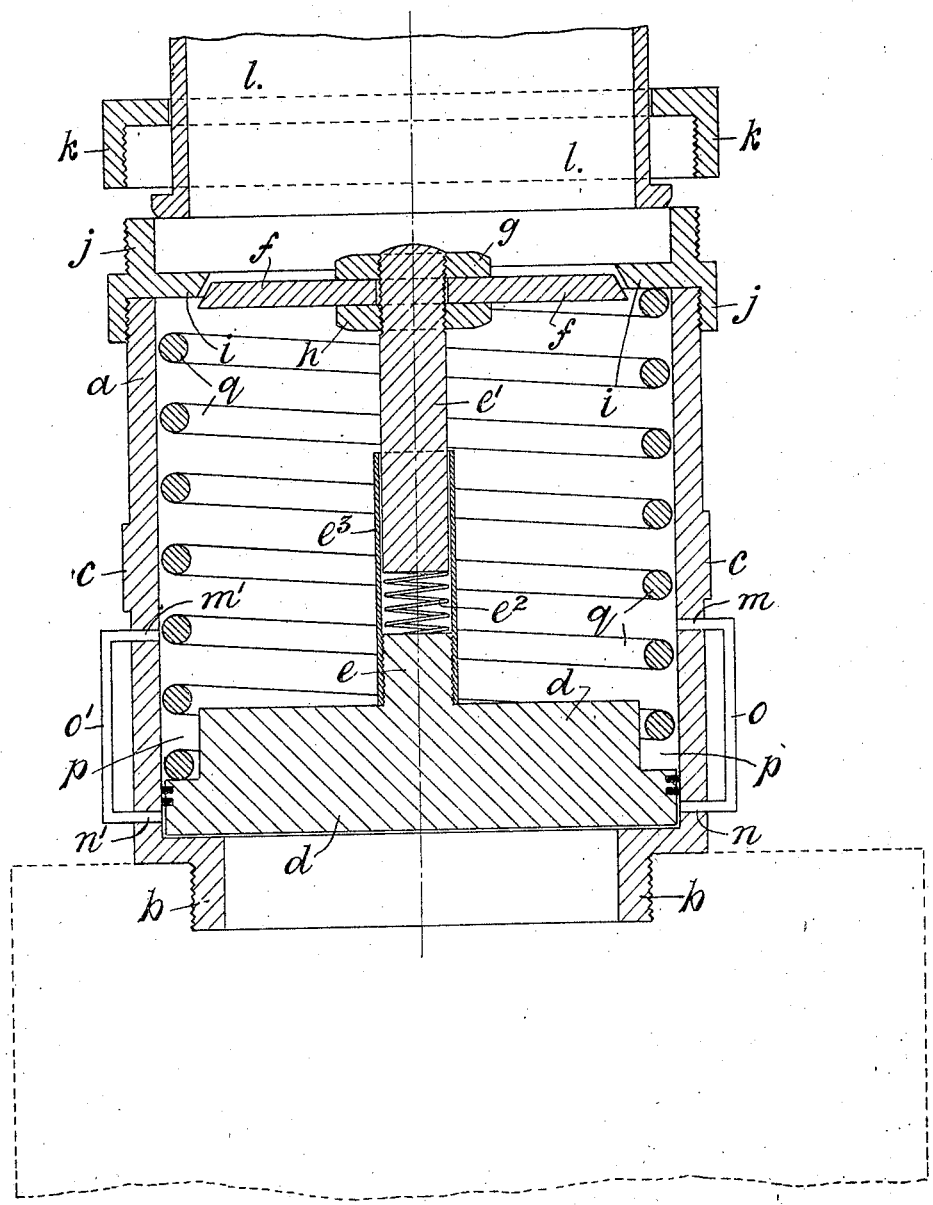

WILLIAM SAMUEL, OF SWANSEA VALLEY, AND WILLIAM AUBREY JONES, OF SWANSEA, WALES.

MEANS FOR INJECTING WATER INTO THE CYLINDERS OF INTERNAL-COMBUSTION ENGINES.

1,262,265.   Specification of Letters Patent.   Patented Apr. 9, 1918.

Appliction filed April 21, 1917. Serial No. 163,744.

*To all whom it may concern:*

Be it known that we, WILLIAM SAMUEL, a subject of the King of England, residing at Fronwerdd, Cwmllynfell, Swansea Valley, South Wales, colliery manager, and WILLIAM AUBREY JONES, a subject of the King of England, residing at 75 Rhyddings Park road, Swansea, South Wales, merchant, have invented certain new and useful Improvements in Means for Injecting Water into the Cylinders of Internal-Combustion Engines, of which the following is a specification.

This invention relates to the method of enhancing the efficiency of internal combustion engines by the injection into the working cylinder (or cylinders) thereof of a small charge or quantity of water immediately after the fuel explosion takes place; and has for its object to provide apparatus or means for this purpose which shall be simple in construction and efficient in use, being automatic in action and adapted for ready application to and removal from an engine cylinder.

In apparatus according to this invention, there is provided a cylindrical water receiver the lower end whereof is secured to the engine cylinder and the upper end whereof carries a valve seating and is connected to a suitable source of water supply; within said water cylinder is disposed a piston or plunger to an extension or rod whereof a valve closure is secured. Formed in or extending through the cylinder wall are ports or passages one or more of which is or are normally covered or closed by said piston, and another or others is or are above said piston; a water conduit or conduits is or are fitted or arranged between the upper and lower ports, and a spring is employed to maintain said piston in its lower position in the cylinder unless and until subjected to the gaseous pressure generated on the explosion of a fuel charge when it is upwardly displaced, in which movement it first causes the water inlet valve to close, and then uncovers or exposes said lower cylinder port or ports, whereupon a small quantity of water is injected into the engine cylinder; said piston is connected in a yielding or resilient manner with said valve closure in order to permit its (the piston's) upward displacement in its cylinder to uncover or expose said lower port or ports after said closure has seated itself.

We will further describe our invention with the aid of the accompanying sheet of explanatory drawings which illustrate, by way of example only, one mode of embodying same, the apparatus being shown in longitudinal section.

In said drawings, $a$ designates a water cylinder constructed of any suitable metal, the lower end $b$ whereof is reduced and screw-threaded in order that it may be screwed into a tapped passage socket provided for its reception in the engine cylinder. On the outside of said cylinder $a$ there is preferably formed a hexagonal portion $c$ so that the apparatus may be screwed to the engine cylinder by the aid of a spanner.

Within said water cylinder $a$ is disposed a piston or plunger $d$ (which may be fitted with packing rings, if desired) provided with a rod in two parts $e$ and $e^1$ the upper portion $e^1$ whereof is screw threaded and receives a valve closure $f$ which is adjustably secured or positioned by the aid of nuts $g$ $h$ screwed on to said rod part $e$ respectively above and below said closure $f$. Disposed between said rod parts $e$ $e^1$ is a coiled spring $e^2$, and screwed on to said rod part $e$ is a tube or sleeve $e^3$ which constitutes a guide for the rod part $e^1$ and also maintains spring $e^2$ in position.

Screwed on to the upper end of said water cylinder $a$ is a valve seating $i$ on which is formed a screw threaded flange $j$ adapted to receive a union joint $k$ whereby a pipe $l$ in communication with a suitable water supply receptacle is connected to said cylinder $a$.

Said water supply receptacle may be connected with the water circulating system of the engine, or a tank especially provided for the purpose may be employed; and if desired, the water may be supplied to the apparatus under artificial pressure.

Extending through the wall of said cylinder $a$ are upper and lower ports or passages $m$ $m^1$ and $n$ $n^1$ respectively, the ports in vertical alinement being in communication by means of one or other of the pipes $o$; these ports are so arranged that when the piston $d$ is in its lowermost position within cylinder $a$ the lower ports $n$ $n^1$ are covered or closed thereby and the upper ports $m\ m^1$ are above said piston, and open at all times to cylinder $a$.

An annular recess $p$ is formed in said piston $d$ in which recess lies—being guided thereby—the lower end of a helical spring $q$ arranged around the inner wall of cylinder $a$ and extending upwardly to the valve seating $i$.

Said spring $q$ is designed to be of sufficient strength to maintain said piston $d$ quiescent against pressure acting on the underside of said piston arising from the compression of the fuel charge in the engine cylinder, but permits said piston to give or yield under the superior pressure caused by an explosion.

Normally the parts of the apparatus are in the positions illustrated in the drawings, the valve closure $f$ being clear of its seating $i$ so that the cylinder and pipes $o$ are full of water admitted through the open valve from the source of supply and piston $d$ is covering the lowermost cylinder ports $n\ n^1$. This condition of the apparatus is maintained during the suction stroke of the engine, and also during the compression stroke for the before stated reason that spring $q$ is designed to be sufficiently strong or stiff to withstand the pressure of compression acting on piston $d$ without permitting upward displacement of said piston, but in the event of upward piston movement taking place against the resistance of the spring on compression this is provided for by fixing the position of the cylinder ports $n\ n^1$ at or about the middle of the piston when in its lowermost position as shown in the drawings, so that a certain amount of piston displacement may actually take place without danger of said lower ports becoming uncovered. On each engine explosion taking place piston $d$ is forced upwardly against the resistance of said spring $q$ and valve $f$ closes on to its seating $i$; and in its (the piston's) continued upward movement (which is now against the small added resistance of the spring $e^2$) the cylinder ports $n\ n^1$ are uncovered, with the result that a small charge or quantity of water is forced or injected into the combustion chamber of the engine.

The parts then reassume their normal positions under the influence of said springs $q$ and $e^2$, valve $f$ opening to admit water from the supply tank for the replenishment of cylinder $a$ and ports $n\ n^1$ being covered again by the piston $d$ in its downward movement.

Having now described our invention, what we claim as new and desire to secure by Letters Patent is:—

An apparatus whereby a charge or a quantity of water is injected into the cylinder of an internal combustion engine, comprising a cylindrical water receiver, the lower end whereof is secured to the cylinder and the upper end whereof carries a valve seating and is connected to a suitable source of water supply; a piston disposed in said water cylinder; a two part piston rod connected to said piston; a spring interposed between the parts of said rod; a sleeve adapted to form a guide for the upper part of said rod parts and also an inclosure for said spring; a valve closure secured to the upper of said rod parts; said engine cylinder having a wall thereof provided with a plurality of ports one of which is normally covered by said piston, and another whereof is above the same; a water conduit fitted between said upper and lower ports of said cylinder, and a spring designed to maintain said piston in its lower position in the cylinder until subjected to the gaseous pressure generated on the explosion of a fuel charge in the engine cylinder.

In testimony whereof we affix our signatures in the presence of two witnesses.

WILLIAM SAMUEL.
WILLIAM AUBREY JONES.

Witnesses:
GEORGE CULCLIFFE,
EDWARD MORSEY.